Figure 5:
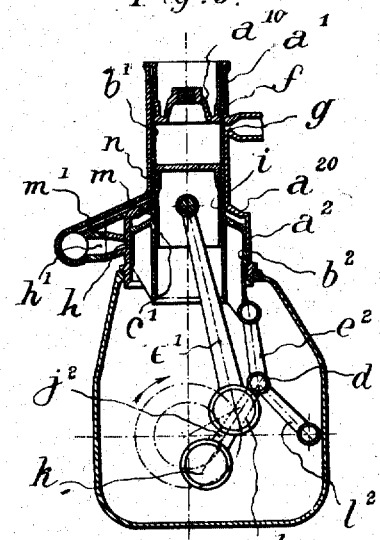

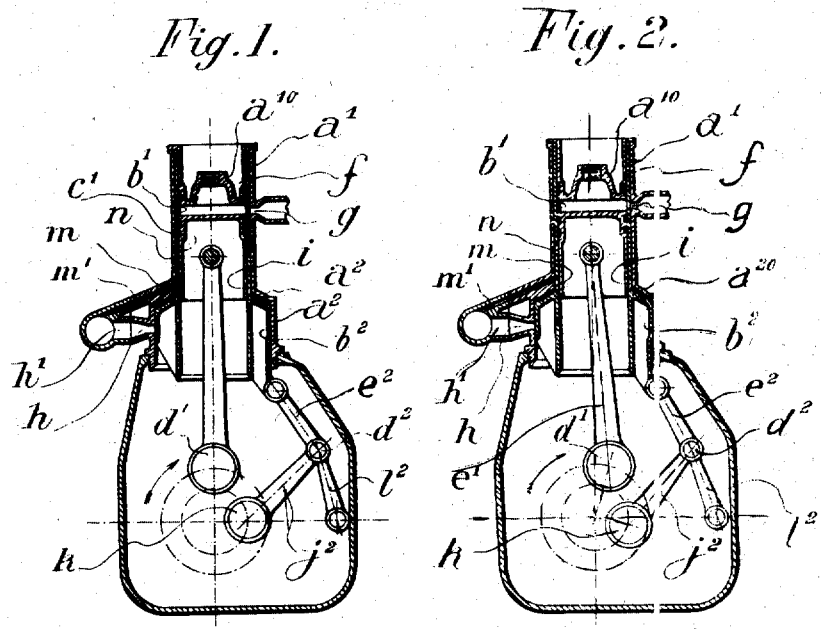
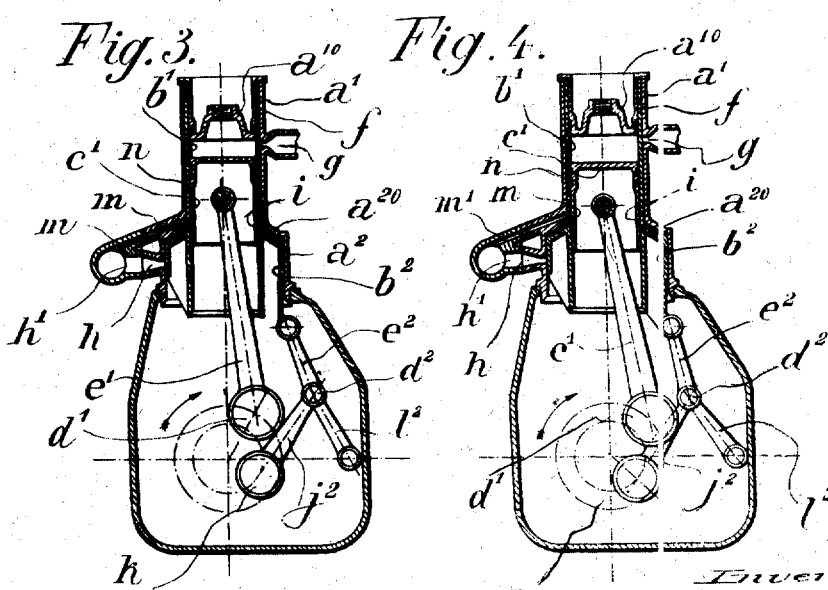

C. M. P. MONTBARBON & G. E. CHÉDRU.
H. WAEL, ADMINISTRATOR OF C. M. P. MONTBARBON, DEC'D.
INTERNAL COMBUSTION ENGINE.
APPLICATION FILED JAN. 8, 1914.

1,219,982.

Patented Mar. 20, 1917.
6 SHEETS—SHEET 3.

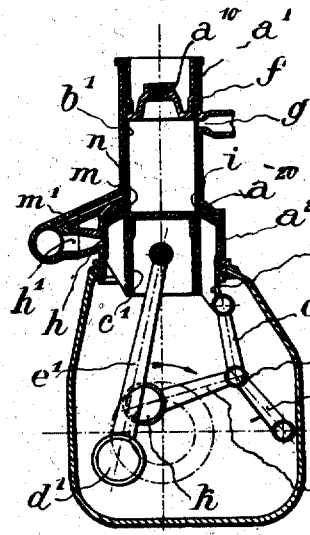
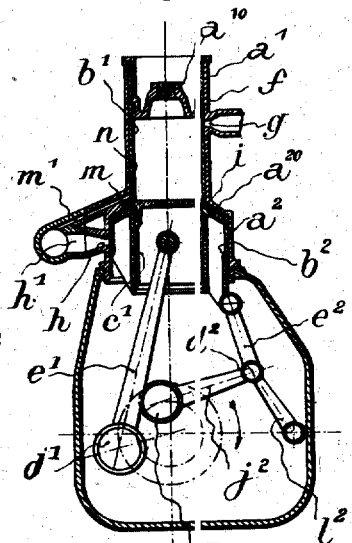
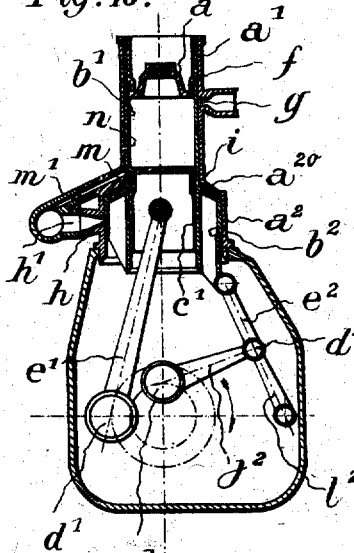
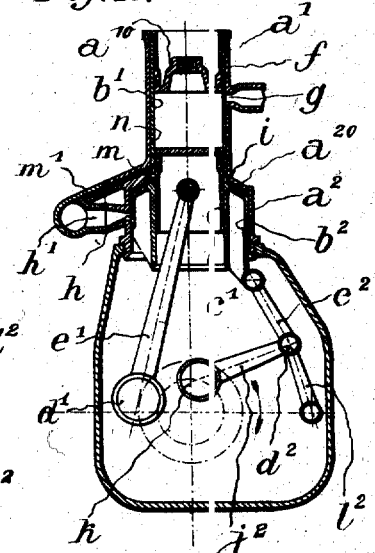

C. M. P. MONTBARBON & G. E. CHEDRU.
H. WAEL, ADMINISTRATOR OF C. M. P. MONTBARBON, DEC'D.
INTERNAL COMBUSTION ENGINE.
APPLICATION FILED JAN. 8, 1914.

1,219,982.

Patented Mar. 20, 1917.

Witnesses:

Inventors
Charles M. P. Montbarbon
Gustave E. Chedru
by
Attorney

UNITED STATES PATENT OFFICE.

CHARLES MAURICE PHILIPPE MONTBARBON, OF NEUILLY-SUR-SEINE, AND GUSTAVE EMILE CHÉDRU, OF ALFORT, FRANCE; HENRI WAEL, OF LEVALLOIS-PERRET, FRANCE, ADMINISTRATOR OF SAID CHARLES MAURICE PHILIPPE MONTBARBON, DECEASED.

INTERNAL-COMBUSTION ENGINE.

1,219,982.  Specification of Letters Patent.  Patented Mar. 20, 1917.

Application filed January 8, 1914. Serial No. 811,030.

*To all whom it may concern:*

Be it known that we, CHARLES MAURICE PHILIPPE MONTBARBON and GUSTAVE EMILE CHÉDRU, citizens of the French Republic, residing at Neuilly-sur-Seine, Seine, France, and Alfort, Seine, France, respectively, have invented certain new and useful Improvements in Internal-Combustion Engines, of which the following is a specification.

This invention relates to two-stroke internal combustion engines, and relates more particularly to those engines having a sleeve or sleeve valves.

This invention further relates to internal combustion engines of the kind having a differential cylinder, the larger portion of which forms together with another portion of the engine, an annular chamber constituting the body of the said pump which has a piston different from that of the engine.

According to this invention the distribution of the engine is arranged so that the fresh gases drawn in by the pump are transferred direct from the latter into the engine cylinder, without having been previously subjected to compression.

The invention will be understood from the following description, as well as from the accompanying drawings which are given merely by way of example.

Figures 1–24 of the said drawing show in longitudinal section, at a right angle to its crank, and in twenty four successive positions of its movable parts, corresponding to as many angular movements of 15° each of the said crank, a two stroke internal combustion or explosion engine with charging pump, designed according to this invention.

When it is desired to construct a two stroke explosion engine with charging pump and a sleeve arranged between the engine piston and the wall of its cylinder, of the kind comprising a differential cylinder, the larger portion of which forms simultaneously with the sleeve of the engine, an annular pump body which constitutes the body of the charging pump, and the sleeve of which is constituted by a cylindrical extension of the piston of the said pump, the proceeding is as follows:

The engine embodying the present invention comprises the following elements:—

(1) a differential cylinder, the small portion $a^1$ of which constitutes the cylinder of the engine and is closed at the top by a head $a^{10}$, is connected to the portion $a^2$ of larger diameter which constitutes the outer wall of the annular body of the charging pump, by a connecting surface $a^{20}$ which forms the cover of the said body;

(2) an annular piston $b^2$ which acts as a piston in the portion $a^2$ of the cylinder, and is extended by a cylindrical part $b^1$ which forms a sleeve in the portion $a^1$ of the said cylinder;

(3) an ordinary piston $c^1$ which forms a piston in the cylindrical portion $b^1$ and consequently in the portion $a^1$;

(4) a crank shaft $d^1$ and a connecting rod $e^1$, which connects the piston $c^1$ to the crank shaft $d^1$;

(5) a port $f$ provided in the sleeve $b^1$ so that it uncovers at the desired moment an exhaust port $g$ provided in the cylinder $a^1$.

In accordance with the invention in the wall of the cylinder $a^2$ is provided an inlet port $h$ which is not uncovered by the piston $b^2$ until the latter arrives close to its lower dead center, and the said port is connected by a conduit $h^1$ to a suitable feeding arrangement, in this case, a carbureter; a port $i$ is also provided in the sleeve $b^1$ preferably level with the upper face of the piston $b^2$, so that as long as it is not covered by the piston $c^1$, it establishes direct communication between the inner chamber of the charging pump and that of the engine cylinder.

The driving of the piston $b^2$ is arranged so that during the whole time that the said piston makes its upstroke, the port $i$ remains uncovered by the piston $c^1$, and so that it remains closed by the said piston $c^1$ while the latter is making the greatest portion of its down stroke; for which reason, the arrangement is preferably made so that the sleeve $b^1$ does not reach the bottom of its down stroke until a short time before the piston $c^1$ arrives at the end of its down stroke, and on the contrary returns to the end of the up stroke a long time before the piston $c^1$ has completed its up stroke. To that end is used such an arrangement for driving the sleeve $b^1$ that the said sleeve remains practically stationary for a certain time while it is in the neighborhood of its upper dead center, and makes more quickly than the piston $c^1$ of the engine, its up and down strokes. This arrangement for driving is constituted by a connecting rod $e^2$ pivoted at one end to the piston $b^2$ secured to the said sleeve $b^1$, and at its other end to a pin $d^2$ connected to an arm $j^2$ which may either be actuated by an eccentric keyed to the driving shaft with an advance of approximately 90°, relatively to the crank $d^1$, or, and as shown in the drawing, pivoted to the pin $k$ of a crank fastened in the same manner to the driving shaft, and also pivoted to an arm $l^2$ made of such a length and pivoted to the frame at such a point that when the engine shaft rotates, the said arm is forced to oscillate between two end positions between which it occupies, at a certain moment, an intermediate position in which it is in line with the connecting rod $e^2$. Owing to this when the arm $l^2$ swings from one of its end positions to the intermediate position, the piston $b^2$ will move upwardly, when said arm $l^2$ passes said intermediate position and moves toward its other end position, and returns from the latter position to the same intermediate position, the piston $b^2$ will oscillate in the neighborhood of its upper dead center, and finally, when it returns from the said intermediate position to its first end position the piston $b^2$ will make its down stroke.

An arrangement is provided for driving the piston $b^2$ of the charging pump so that the latter has a smaller stroke than the engine piston, but, nevertheless, the speed of movement of the said piston $b^2$ is such that, when the piston $c^1$ of the engine makes its upstroke which it begins with a slight retardation relatively to that of the said piston $b^2$, it covers the port $i$ of the sleeve $b^1$ secured to the said piston $b^2$, only when the latter has arrived at the end of its up stroke. For this reason the crank, the pin of which carries the arm $j^2$, and the arm $l^2$ are calculated so that the piston $b^2$ makes its forward or return stroke while the engine shaft makes practically one-third of a revolution.

The exhaust ports $f$ and $g$ are arranged so that the said ports are opposite each other only when the sleeve $b^1$ arrives at its lower dead center, that is to say, when the piston $c^1$ of the engine has already effected the greatest portion of its down stroke, and the exhaust is closed almost as soon as the sleeve has begun its up stroke, in order that during almost the whole time that the fresh gases are being transferred from the pump chamber into that of the cylinder, the exhaust remains closed. Owing to this it is possible, by giving the same stroke to the piston of the pump, but by increasing its diameter, to send into the cylinder the desired quantity of gas and consequently, without the risk of losing gases by exhaust, to over-charge the engine and thus to obtain an engine with an inconsiderable weight per horse power.

The arrangement of the inlet port $h$ is such that it is uncovered by the pump piston a little before the exhaust begins to open. Owing to this, when the piston $c^1$ has descended sufficiently to uncover the port $i$, the fresh gases passing into the chamber of the pump through the conduit $h^1$, pass into the cylinder through the port $i$ under the action of the depression produced by the exhaust.

There is provided in the cylinder an additional inlet port $m$ connected by a conduit $m^1$ to the inlet conduit $h^1$, and in the sleeve such a port $n$ that it uncovers the said port $m$ immediately after the port $f$ has begun to uncover the exhaust port $g$ and before the piston has uncovered the port $i$ of the sleeve. Owing to this the fresh gases which, under the action of suction in the pump, enter through the conduit $h^1$, are partly forced back under the action of their momentum into the conduit $m^1$ from whence they pass into the cylinder through the ports $m$ and $n$, owing on the one hand to the said momentum, and on the other hand, to the suction produced in the said cylinder by the exhaust.

The inner wall of the cover $a^{20}$ of the pump body, as well as of the upper face of the piston $b^2$ are arranged so that they have a surface either of the form of a truncated cone (as in the example shown in the drawings) or ogival. This arrangement is really of great importance from the point of view of oblique direction given to the fresh gases when they pass from the pump into the cylinder, which enables the fresh gases to be projected against the cover $a^{20}$ of the pump, and ignition to be obtained in good conditions, in spite of the fact that the engine does not scavenge.

Figure 6:
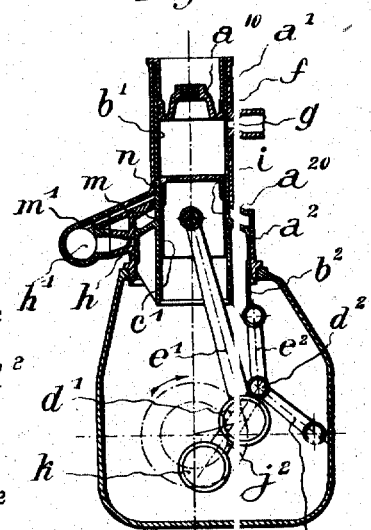
Figure 7:
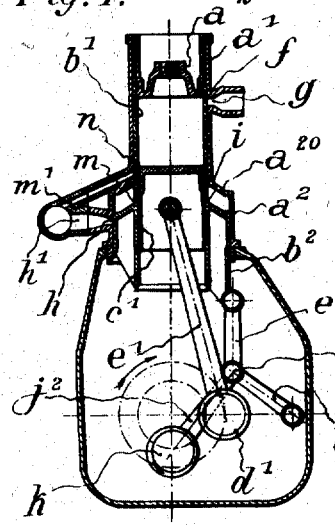
Figure 8:
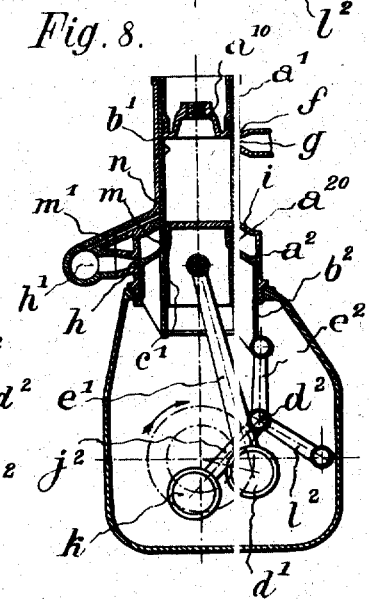
Figure 9:
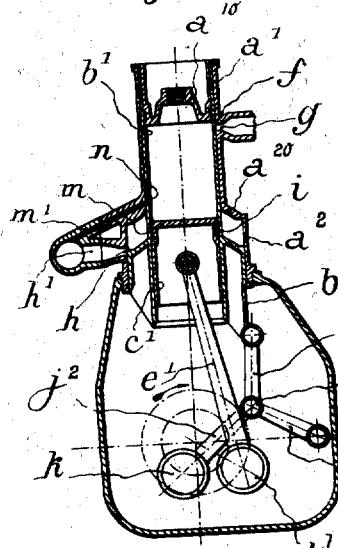
Figure 10:
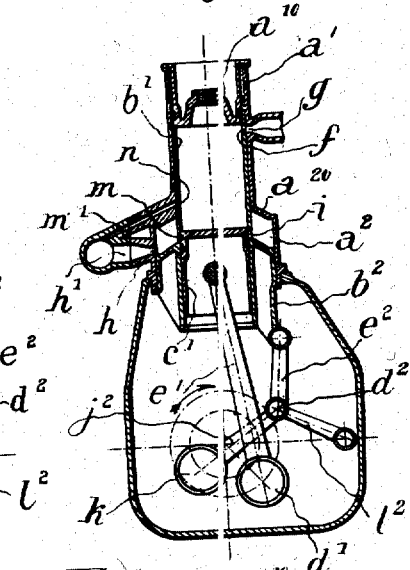
Figure 11:
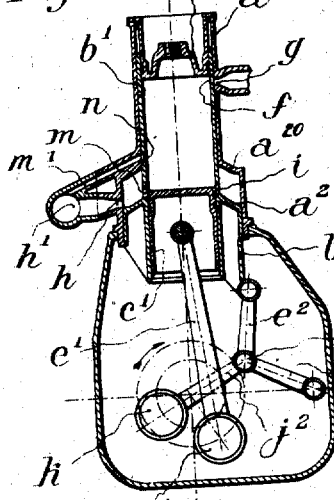
Figure 12:
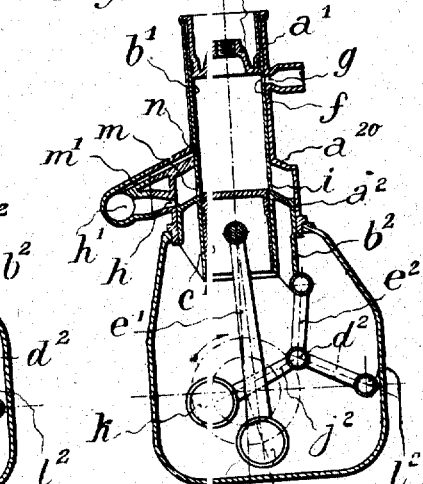
Figure 13:
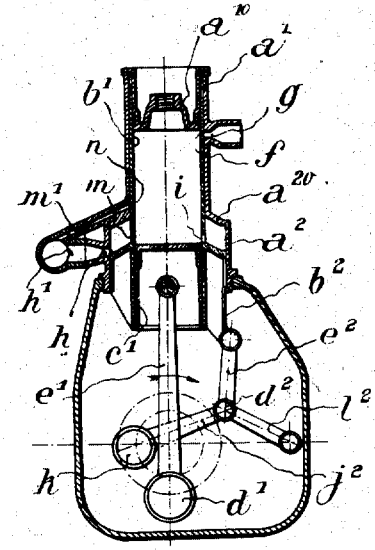
Figure 14:
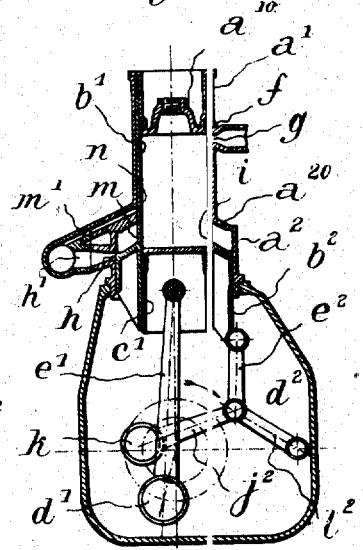
Figure 15:
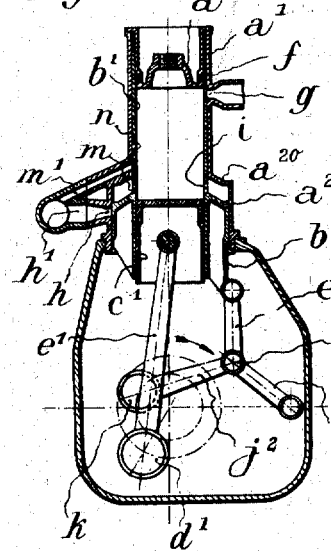
Figure 16:
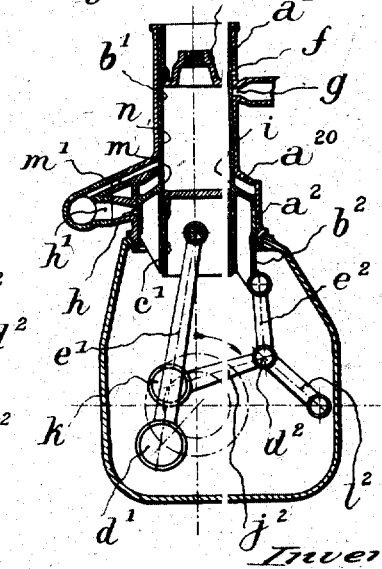
Figure 21:
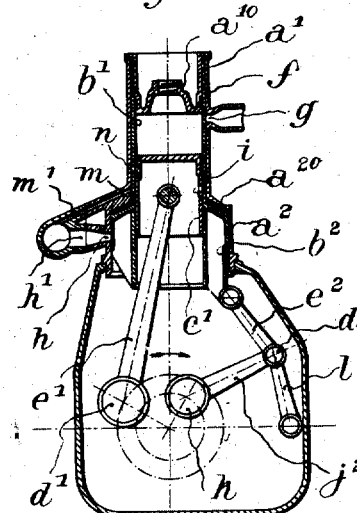
Figure 22:
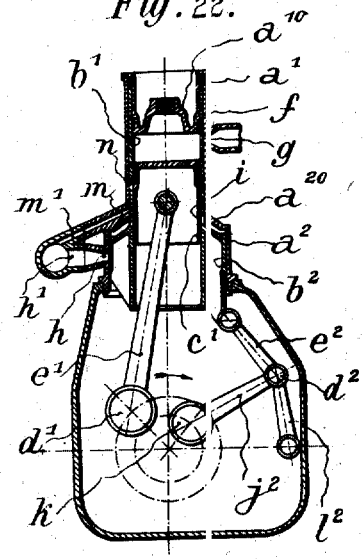
Figure 23:
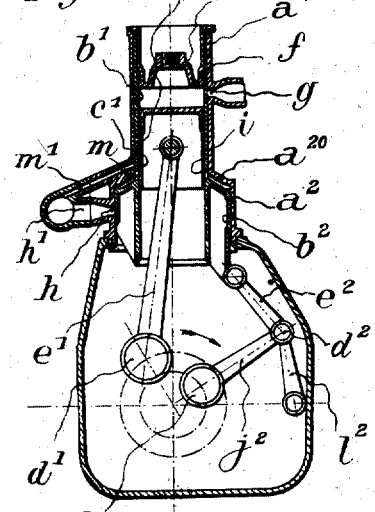
Figure 24:
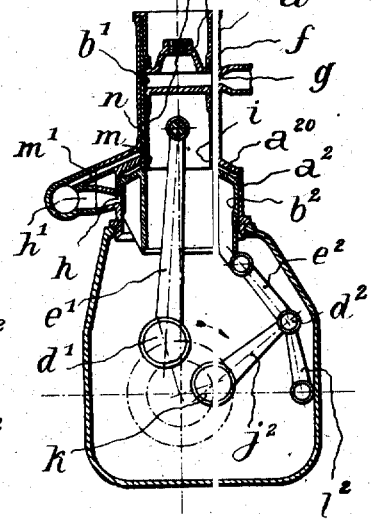

Owing to which there will be obtained, assuming that the movable arrangements are first considered at the moment when they are in the respective position in which they are shown in Fig. 1, that is to say, in which the piston $c^1$ is at its upper dead center, there is no coincidence between the ports $f$ and $g$ nor between the ports $m$ and $n$, closing of the port $h$ by the piston $b^2$ and absence of communication between the port $i$ and the explosion chamber, and also a certain quantity of fresh gas is contained in the said chamber under pressure. An explosion of the quantity of gas and the forcing of the piston $c$ downward then takes place, at the beginning of which movement the explosion chamber remains completely closed, and the sleeve $b^1 b^2$, after having arrived at its upper dead center (Fig. 19), has slightly descended, slowly rises (Fig. 2), in order to return to its upper dead center and to begin to descend again (Fig. 3). A descent of the piston $c^1$ and of the sleeve $b^1 b^2$ then takes place with expansion of the burnt gases in the explosion chamber which remains completely closed; and production of a vacuum in the chamber of the pump body, which also remains completely closed (Figs. 4-6). Then a descent of the piston $c^1$ takes place and of the sleeve $b^1$ $b^2$ and the continued expansion of the burnt gases in the explosion chamber which remains completely closed, in spite of the piston $c^1$ having uncovered the port $n$, since the latter is not opposite the port $m$ and a quick descent of the sleeve $b^1$ $b^2$ which has passed beyond the middle of its downstroke and continues to produce a vacuum in the pump chamber (Fig. 7). The descent of the piston $c^1$ then continues and also of the sleeve $b^1$ $b^2$, the latter arriving almost at the end of the stroke and uncovering the inlet port $h$ by the piston $b^1$. Then the arrival of fresh gases into the pump chamber and the flow under the action of suction of the pump and of the momentum thus given to the said gases, of a portion of the latter into the conduit $m^1$ and the continuation of the expansion in the explosion chamber which still remains completely closed (Fig. 8). On continuation of the descent of the piston $c^1$ and of the sleeve $b^1$ $b^2$, the latter moves near its lower dead center and uncovering of the exhaust port $g$ by the port $f$ of the sleeve takes place and immediately afterward uncovering of the additional inlet port $m$ by the port $n$ of the sleeve. The burnt gases exhaust with a certain advance relatively to the intake of explosive mixture, which produces a depression in the explosion chamber, and flow of the fresh gases into the said chamber through the conduit $m^1$ and the ports $m$ and $n$ then occurs (Figs. 9 and 10). On continuation of the descent of the piston $c^1$ and the arrival at the lower dead center of the sleeve $b^1$ $b^2$ the exhaust opens to the full extent and also the additional inlet, and the piston $c^1$ begins to uncover the port $i$, whereupon the admission of fresh gases into the explosion chamber owing to the depression produced by the exhaust takes place both through the conduit $m^1$ and the ports $m$ and $n$, and through the pump and the port $i$ (Fig. 11). The piston $c^2$ continues its descent and the sleeve begins to rise which causes the complete uncovering of the port $i$ and begins the closing of the additional inlet $n$ and of the exhaust $g$. The arrival of fresh gases into the cylinder continues under the action of momentum and depression produced by the exhaust (Fig. 12). The piston $c^1$ arrives at its lower dead center and the rise of the sleeve continues and completely uncovers the port $i$ (Fig. 13). The piston $c^1$ begins to rise and so does the sleeve, which takes place very quickly. The exhaust then closes also the additional inlet $m$ and the inlet opening $h$ and the beginning of transfer into the explosion chamber of the fresh gases contained in the chamber of the pump takes place (Fig. 14). The rise of the piston $c^1$ and of the sleeve $b^1$ $b^2$ still takes place and direct transfer of the fresh gases from the pump into the working chamber, without compression of any sort or intermediate conduit or chamber (Figs. 15-18). The piston $c^1$ then continues to rise and the sleeve arrives at its upper dead center; the piston $c^1$ covers the port $i$ and the compression of the fresh gases by the said piston $c^1$ in the explosion chamber begins (Fig. 19). On continuation of the rise of the piston $c^1$ and of the compression of fresh gases in the explosion chamber, there is a descent to a small extent of the piston sleeve $b^1$ $b^2$ which does not produce any effect (Figs. 20-23).

On the arrival of the piston $c^1$ at the end of the stroke, the end of compression and rising of the piston sleeve $b^1$ $b^2$ takes place (Fig. 24), and then, the engine being again in the initial state, the operation begins again as before.

It is obvious that the invention is by no means limited to the precise construction of carrying it out which has been herein shown and described, but comprises on the contrary any modification within the scope of the claims.

What we claim as our invention and desire to secure by Letters Patent is:—

1. A two-stroke internal combustion engine comprising a cylinder having portions of different sizes, the smaller portion forming a combustion chamber and the larger portion forming an annular pump chamber, pistons operative in the combustion and pump chambers, means of communication being provided between the pump chamber and combustion chamber, and means for operating the pump piston whereby fresh gases drawn in by the pump are transferred direct from the latter into the engine cylinder without having previous compression.

2. In an internal combustion engine, the combination of an engine cylinder having a piston working therein, a pump cylinder also having a pump piston working therein, means of communication being provided between the pump and engine cylinders, and the engine cylinder having means for exhausting gases therefrom, a sleeve movable with the pump piston and having ports controlling the means of communication between said pump cylinder and engine cylinder and the exhaust of the engine cylinder, a crank shaft operatively connected to the engine piston, and means driven by said shaft for reciprocating the pump piston and sleeve with a less stroke than the engine piston and producing the forward and return strokes of said pump piston and sleeve during approximately two-thirds of a revolution of the crank shaft, and maintaining said pump piston and sleeve substantially stationary at one end of their stroke while the shaft completes the remainder of its revolution.

3. In an internal combustion engine, the combination of an engine cylinder having a piston working therein, a pump cylinder also having a pump piston working therein, means of communication being provided between the pump and engine cylinders, and the engine cylinder having means for exhausting gases therefrom, a sleeve movable with the pump piston and having ports controlling the means of communication between said pump cylinder and engine cylinder and the exhaust of the engine cylinder, a crank shaft operatively connected to the engine piston, and means driven by said shaft for reciprocating the pump piston and sleeve with a less stroke than the engine piston and causing said pump piston and sleeve to commence their return stroke slightly in advance of the return stroke of the engine piston to close the exhaust means when the engine piston commences its return stroke, and completing the return stroke of the pump piston and sleeve when the engine piston is approximately midway of its return stroke.

4. In an internal combustion engine, the combination of an engine cylinder having a piston working therein, a pump cylinder also having a pump piston working therein, means of communication being provided between the pump and engine cylinders, and the engine cylinder having means for exhausting gases therefrom, a sleeve movable with the pump piston and having ports controlling the means of communication between said pump cylinder and engine cylinder and the exhaust of the engine cylinder, a crank shaft operatively connected to the engine piston, and means driven by said shaft for reciprocating the pump piston and sleeve with a less stroke than the engine piston and causing said pump piston and sleeve to commence their return stroke slightly in advance of the return stroke of the engine piston to close the exhaust means when the engine piston commences its return stroke, and completing the return stroke of the pump piston and sleeve when the engine piston is approximately midway of its return stroke, said driving means comprising a rod pivoted at one end to said pump piston, a crank or eccentric on said shaft connected to the opposite end of said rod, and an arm connected at one end to the latter end of said rod and at its opposite end to a stationary pivot.

5. In an internal combustion engine, the combination of an engine cylinder having a piston working therein, a pump cylinder also having a pump piston working therein, means of communication being provided between the pump and engine cylinders, and the engine cylinder having means for exhausting gases therefrom, a sleeve movable with the pump piston and having ports controlling the means of communication between said pump cylinder and engine cylinder and the exhaust of the engine cylinder, a crank shaft operatively connected to the engine piston, and means driven by said shaft for reciprocating the pump piston and sleeve with a less stroke than the engine piston and causing said pump piston and sleeve to commence their return stroke slightly in advance of the return stroke of the engine piston to close the exhaust means when the engine piston commences its return stroke, and completing the return stroke of the pump piston and sleeve when the engine piston is approximately midway of its return stroke, a toggle connected at one end to the pump piston and at its opposite end to a stationary pivot, and means reciprocable by the crank shaft and connected to the intermediate portion of the toggle.

6. A two-stroke internal combustion engine comprising an engine cylinder having an engine piston reciprocable therein and an exhaust port, a pump cylinder, a pump piston reciprocable therein and having a sleeve movable therewith and controlling said exhaust port, and means for reciprocating said pump piston and sleeve whereby said pump piston will make its return stroke during the return stroke of the engine piston and said sleeve will close said exhaust port upon the commencement of the return stroke of the engine piston, said sleeve having a port to conduct explosive mixture from the pump cylinder directly into the engine cylinder during the whole of the return stroke of the pump piston.

7. A two-stroke internal combustion engine comprising an engine cylinder having an engine piston reciprocable therein and an exhaust port, a pump cylinder, a pump piston reciprocable therein and having a sleeve movable therewith and controlling said exhaust port, and means for reciprocating said pump piston and sleeve whereby said pump piston will make its return stroke during the return stroke of the engine piston and said sleeve will close said exhaust port upon the commencement of the return stroke of the engine piston, said sleeve having a port to conduct explosive mixture from the pump cylinder directly into the engine cylinder during the whole of the return stroke of the pump piston, said sleeve also having a port for admitting explosive mixture into the engine cylinder independently of the pump cylinder and prior to the closing of the exhaust port.

8. In an internal combustion engine, the combination of an engine cylinder having a piston working therein, a relatively larger pump cylinder connected to receive explosive mixture and transfer the same to the engine cylinder, and a pump piston working in the pump cylinder, the pump cylinder being connected to the engine cylinder by a port formed in the pump piston and controlled by the movement of said pump piston, a wall leading to said port and having the form substantially of a truncated cone, and the top of the pump piston having a form corresponding to that of said wall and operative to direct the explosive mixture from the pump cylinder toward and through said port.

9. An internal combustion engine of the type described comprising a working cylinder having a piston to reciprocate therein, an annular chamber surrounding the lower portion of the working cylinder and forming with the latter an annular pump cylinder, a pump piston reciprocable in said annular chamber, a port being formed in the wall of the working cylinder to provide communication between the working cylinder and the annular pump cylinder at a point immediately adjacent to the head of the pump cylinder, and a port being provided to admit fresh gas to the pump cylinder, and means for reciprocating the pump piston relatively to the working piston to cause the pump piston to uncover the fresh gas admission port while the intercommunicating port between the pump cylinder and the working cylinder is uncovered by the working piston whereby fresh gas passes across the top of the pump piston directly from the fresh gas admission port through the pump cylinder and into the working cylinder free of compression in the pump cylinder.

10. An internal combustion engine of the type described comprising a working cylinder and a pump cylinder, pistons reciprocable in said cylinders, a port being formed in the wall of the working cylinder to provide communication between the latter and the pump cylinder, and a fresh gas supply port being provided for the pump cylinder, and means for reciprocating the pump piston relatively to the working piston to cause the pump piston to uncover the fresh gas supply port while the port for the working cylinder is open and to cause the pump piston to arrive at the end of its in-stroke slightly before the working piston, in making its in-stroke, covers the intermediate port between the pump cylinder and the working cylinder.

In testimony whereof we have signed our names to this specification in the presence of two subscribing witnesses.

CHARLES MAURICE PHILIPPE MONTBARBON.
GUSTAVE EMILE CHÉDRU.

Witnesses:
HANSON C. COXE,
PAUL BLUM.